Figure 1:
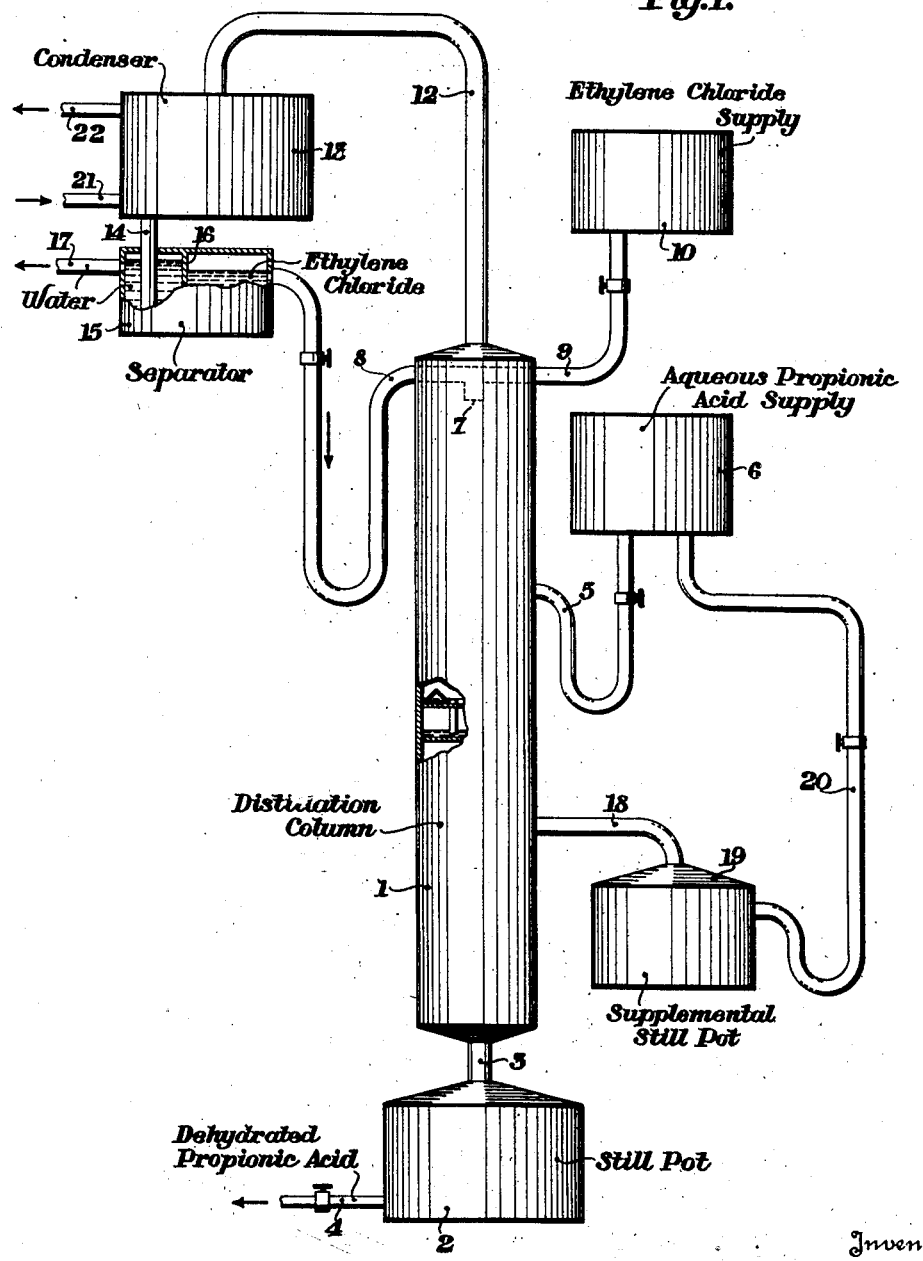

Dec. 12, 1933.  H. G. STONE  1,939,237.
PROCESS OF DEHYDRATING AQUEOUS SOLUTIONS CONTAINING PROPIONIC ACID
Filed July 13, 1931  2 Sheets-Sheet 2

Plain Distillation of Propionic Acid.

Azeotropic Distillation of Aqueous
Propionic Acid with Ethylene Chloride.

Inventor:
Herbert G. Stone,

Patented Dec. 12, 1933

1,939,237

UNITED STATES PATENT OFFICE 1,939,237

PROCESS OF DEHYDRATING AQUEOUS SOLUTIONS CONTAINING PROPIONIC ACID

Herbert G. Stone, Kingsport, Tenn., assignor to Eastman Kodak Company, Rochester, N. Y., a corporation of New York Application July 13, 1931. Serial No. 550,399

13 Claims. (Cl. 202—42)

This invention relates to processes of removing water from aqueous aliphatic acids and more particularly to processes for the dehydration of dilute aqueous solutions of propionic acid, and other higher aliphatic acids up to five carbon atoms or mixtures thereof.

The removal of water wholly or partially from aqueous aliphatic acids or mixtures thereof is a problem of great technical importance. For example, certain chemical processes, such as the manufacture of cellulose acetate or propionate, require large quantities of highly concentrated or anhydrous acids and after such processes are completed there is often left a large amount of dilute acid from which the water must be removed before the acid can be reemployed. It is obvious that to lessen the expense of such removal is highly desirable. Furthermore, in the initial stages of the production of these acids they are too diluted with water for most manufacturing processes. Taking the manufacture of acetic acid by the destructive distillation of wood as an example, there is initially produced a dilute impure aqueous solution or mixture of acetic, propionic and other aliphatic acids which is called pyroligneous liquor. After separating out most of the impurities, the solution must be concentrated and it is therefore highly desirable that this be accomplished by a process which is simple and more inexpensive than those used heretofore. Likewise, when the acids above referred to are produced by the action of microorganisms, they are formed in dilute aqueous solutions which must be concentrated and in this case it is equally desirable that the water be removed as simply and as cheaply as possible. Various processes for the concentration or dehydration of aliphatic acids have been devised, some of which operate upon the principle of separation of the components mixed with the acid by rectification of distilled vapors, while others operate upon the principle of employing a liquid with the aqueous acid which forms a constant boiling mixture with the water whereby it is entrained and carried away by vaporization.

However, until the invention described in U. S. Patent 1,804,745 to Clarke and Othmer, no process had been devised which would efficiently and substantially completely concentrate dilute aqueous solutions of acetic acid without additional distillation operations being performed upon the azeotropic distillate.

This invention has as an object to provide a process of removing water from dilute aqueous solutions of propionic and other higher aliphatic acids up to 5 carbon atoms or mixtures thereof. Hereinafter, where I refer to the higher aliphatic acids it will be understood that I refer to those having 3-5 carbon atoms. A further object is to provide such a process which will be simple and inexpensive, yet applicable to solutions of any strength. A still further object is to provide a process which is applicable, not only to relatively pure water solutions of propionic and other higher aliphatic acids, but also to the production of concentrated acids from crude aqueous solutions such as the pyroligneous liquor obtained from wood distillation which usually contains other acids in addition to propionic. Another object is to provide a process in which the water which is finally removed carries away only a very small or negligible amount of acid with it. It is also an object to provide a process in which distillation is the main factor thereby eliminating the trouble and cost of initial extraction steps. Other objects will appear hereinafter.

These objects are accomplished by the following invention which comprises a distillation process for removing water from higher aqueous aliphatic acids in which a particular water entraining organic liquid is employed. I have found that highly desirable results may be obtained by mixing the aqueous acid or acid mixture with ethylene chloride (which is identical with ethylene dichloride) and distilling water and ethylene chloride from the mixture at a temperature below the boiling point of the acid or acids in question and also below the boiling point of water. It is to be noted that my invention is not an extraction process. On the contrary, the liquid forms an azeotropic mixture with the water present, which mixture separates, upon condensation, into two distinct layers, one of water and the other of entraining liquid. My invention is further distinguished by the fact that the removal of water from the acid takes place at a relatively low temperature and does not require extensive treatment of the distillate for recovery of the water entraining medium, as is generally the case when using high boiling extracting media.

In U. S. Patent 1,804,745 there is disclosed a method for the dehydration of acetic acid by azeotropic distillation with ethylene chloride. I have now discovered, after extensive research, that azeotropic distillation with ethylene chloride may also be effectively applied to the concentration of the higher aliphatic acids such as propionic and butyric acids, either from their pure water solutions or mixtures thereof, together, or with other aliphatic acids such as acetic acid, or from impure aqueous mixtures such as those obtained in the destructive distillation of wood.

My process may be carried out in a fractionating column of known type, the distilled water and ethylene chloride being condensed and allowed to settle into two layers, the ethylene chloride which forms the lower layer being returned to the upper part of the column for reuse. In the preferred embodiment of my process the ethylene chloride passes through a cycle without serious loss and can be used over and over in a continuous manner.

The requirements of an organic auxiliary liquid for use in distilling water from aqueous aliphatic acids are (1) it must not react with the acid nor be decomposed when boiled with the latter into impurities which would contaminate the acid (2) it must be available cheaply in large quantities (3) it should boil at a lower temperature than the acids undergoing dehydration and thus be readily and completely separable from the latter by distillation (4) it must form an azeotropic mixture with water (5) its miscibility with water should be low (6) it must cause the concentration of aliphatic acid in the watery layer of the distillate to be always lower than that of the aqueous acid which is being concentrated, such difference in concentration being as large as possible (7) the latent heat of the liquid and the composition of its azeotropic mixture with water vapor should be such that the amount required for vaporizing a unit amount of water should be as low as possible (8) the distribution ratio of the aliphatic acid between water and said auxiliary liquid, that is, the ratio of acid in the water to that in the liquid when the two liquids containing said acid are in contact, should be low.

I have found that ethylene dichloride meets all of the above requirements with respect to the dehydration of aqueous propionic and butyric acids and their mixtures. This compound is a colorless liquid having the structural formula

It is to be noted that this is a saturated compound and should not be confused with the totally different unsaturated compound known as dichlorethylene. It forms with water an azeotropic mixture which boils at about 72° C. at 760 mm. pressure, the mixture consisting of about 12 parts of ethylene chloride to one part of water by weight. It will therefore be seen that every 12 parts of ethylene chloride which is distilled from the aqueous mixture will carry over approximately one part of water. As substantially none of the propionic or other acid undergoing treatment enters into the azeotropic mixture which is formed, the desired acid is left behind in the column or other distillation vessel in a dehydrated condition. The azeotropic mixture, if analyzed by volume, will be found to contain from 9 to 9½ parts of ethylene chloride to one part of water.

The water and ethylene chloride are driven off from the acid as it descends and the ethylene chloride as it passes upward through the column in successive stages carries with it more and more water until there is distilled off from the top plate of the column the azeotropic mixture of water and ethylene chloride above referred to. It is to be noted as one of the particular advantages of my invention that any unit of ethylene chloride will carry away with it, as an azeotropic mixture, more water than an equal unit of any of the withdrawing agents previously suggested in the art for use in dehydrating aqueous propionic and other aliphatic acids or their mixtures. It will be apparent that, inasmuch as substantially complete dehydration is the object of the process, at least a slight excess of ethylene chloride over that required to form an azeotropic mixture with the water present at any given point should be kept at all points in the system at which distillation takes place or at least at the point where the last vaporization of the mixture occurs. In general it may be said that there should be a little more than twelve times as much ethylene dichloride, by weight, as there is water to be removed.

When using a proper fractionating column, there is less than .2% acid in the watery layer of the distillate in the case of propionic acid and less than .5% in the case of a mixture containing equal parts, by weight, of acetic and propionic acids. Since distillation will not concentrate aqueous acid weaker than the watery layer of the distillate and, since my process in proper apparatus causes virtually no acid to exist in such layer, the process will therefore concentrate propionic acid or mixtures of propionic and acetic acids, for example, of any strength from less than 1% to over 99%. An ethylene chloride layer in contact with the watery layer in the distillate will take up a high proportion of the acid present, or, in other words, the distribution ratio of propionic acid, for example, between water and the entraining liquid at the acid concentrations met with at the head of a well operated column is low. This ratio is much less in the case of propionic acid than in the case of acetic acid so that it is quite apparent that ethylene chloride is quite superior as a withdrawing agent for propionic acid. Since the ethylene chloride layer is returned to the column for reuse, the more acid which it holds upon separation, the less acid goes down the sewer. With both acetic and propionic acids, the distribution of any acid carried over is in favor of the watery layer but as it is less in the case of propionic than in the case of acetic, ethylene chloride is even better adapted to dehydrate propionic acid than acetic acid.

Figure 2:
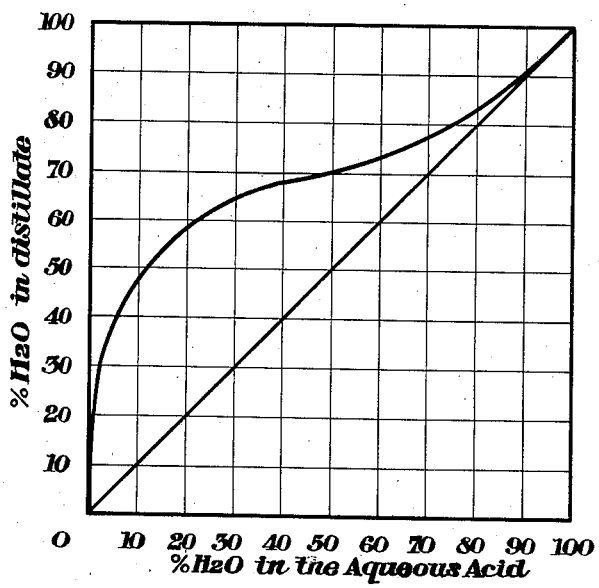
Figure 3:
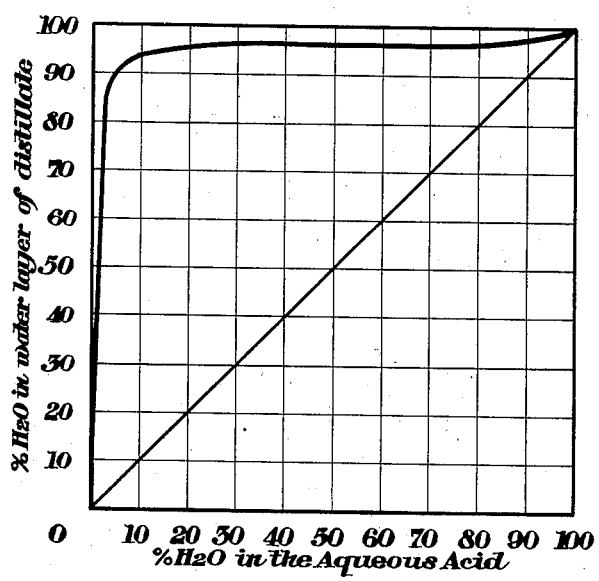

In the accompanying drawings in which like reference characters refer to like parts, Figure 1 is a semi-diagrammatic side elevation of one form of apparatus in which my process may be carried out, certain of the parts being exaggerated and portions of others broken away for clarity, and Figures 2 and 3 are charts showing the comparative effectiveness of water removal from aqueous propionic acid by simple distillation as compared to azeotropic distillation with ethylene chloride.

In Figure 1 the numeral 1 represents a distillation column of well-known construction, such as a column provided with a series of plates with bubble cap construction so that the vapors rising in the column are caused to pass through the liquid which is collected upon each plate. A portion of the column is broken away to show the construction of the plates in diagrammatic form. For carrying out my process, I have found a column still of approximately 40-plate construction to be suitable. At the bottom of the column is provided a still pot 2 of the usual construction, such as that heated by steam pipes or other well-known means. This still pot is connected with the column by a pipe 3 for the purpose of conducting vapors rising from the still pot into the column 1. A suitable draw-off pipe 4 equipped with a valve is provided for the still pot 2 by means of which substantially pure acid may be withdrawn from the still pot as hereinafter further discussed.

At a point approximately two-thirds of the way up the column or, in other words, at a position corresponding approximately to plate No. 25, is provided a valved inlet pipe 5 for the introduction into the column of aqueous acid from the acid supply tank 6, mounted preferably above the inlet pipe in order that the acid will flow into the column by means of gravity. In the top portion of the column 1 and at a point above the uppermost plate in the column is provided an ethylene chloride inlet 7. Two valved ethylene chloride supply pipes 8 and 9, connected with the inlet 7 are provided for the introduction of ethylene chloride into the top of the column. The supply pipe 9 is connected with an ethylene chloride supply tank 10 for a purpose hereinafter described. The function of the supply line 8 will also be more fully discussed.

At the head of the column 1 is provided a vapor outlet pipe 12 which is connected with the condenser 13 which may be cooled by any suitable medium such as water entering and leaving by the pipes 21 and 22, respectively. Any condensate accumulating in the condenser 13 is conducted by means of a pipe 14 into the separator 15, which separator is provided with a baffle plate 16 extending to within a short distance of the bottom of the separator. The pipe 17 carries away water which separates out in the separator and the pipe 8 conducts ethylene chloride which also separates out in the separator back to the head of the column for reuse therein. At a point approximately one-third of the way up the column 1, or at a position approximately opposite plate number 14 of the column, is provided a vapor inlet 18 which connects the supplemental still pot 19 with the column 1. A valved pipe line 20 is provided to conduct aqueous acid from the acid supply tank 6 to the supplemental still pot 19. The still pot 19 may be of construction similar to the still pot 2 and may also be provided with an outlet for withdrawing therefrom such residual impurities as may collect therein. It will be obvious that the construction above described is merely diagrammatic and that the elements described are all well known to those skilled in this art and may be of such suitable construction as would be employed by any distillation engineer.

Assuming the plant to be newly constructed, it is necessary, in order to place it in operation that the still pot 2 be charged with the highly concentrated acid, such, for example, as concentrated propionic acid in the case of concentrating dilute solutions of this acid, and that a supply of dilute acid and ethylene chloride be contained in the tanks 6 and 10, respectively. Through the pipe 5, aqueous acid is introduced slowly into the column 1 and heat applied to the still pot 2. It may be stated at this point that an acid analyzing anywhere from 1% to 99% or more of propionic, acetic, and other acids, may be profitably and successfully concentrated by my process to as strong as 99.8% or more purity. At the same time a supply of ethylene chloride is introduced into the column 1 through the pipe 9. Upon starting the process, therefore, the plates of the lower two-thirds of the column will contain aqueous acid and the plates of the upper third of the column will contain ethylene chloride. This condition exists, however, only at the start of the process as the process soon comes to equilibrium and operates in a continuous manner.

Assuming that the process is to be operated continuously, the various operations are carried out as follows: Upon the top plate of the column there exists a constant boiling mixture of ethylene chloride and water, it being necessary to maintain only upon the upper plate of the column a slight excess of ethylene chloride. This constant boiling mixture of ethylene chloride and water vaporizes or is vaporized by the heat supplied to the column from the still pot 2 and the vapor mixture of water and ethylene chloride passes over through the pipe 12 into the condenser 13 wherein the vapor condenses into a liquid mixture of ethylene chloride and water which then passes through the pipe 14 into the separator 15.

In this separator the ethylene chloride, being the heavier of the two liquids, settles to the bottom and passes under the baffle 16 into the right-hand section of the separator and the water layer is continuously drawn off therefrom by means of the pipe 17 leading to the sewer. The pipe 8 controlled by a valve returns the ethylene chloride to the head of the column whereby means of the inlet 7 it is re-introduced into the system. The process being in continuous operation, it is necessary to introduce very little ethylene chloride from the supply tank 10, inasmuch as it is used only to supply the small amount of ethylene chloride which may be lost in the system, such as through slight leakage or through being carried off by slight occlusion or solution in the water drawn off from the separator by the pipe 17. Assuming that the process is being operated without the assistance of the supplemental still pot 19, aqueous acid is continuously introduced through the pipe 5 at a rate equivalent to the capacity of the column still 1 for dehydrating the aqueous acid. From the point where the acid is introduced into the column, if we proceed downwardly plate by plate, it will be found that the percentage of water in the aqueous acid decreases. If we proceed upwardly from the point at which the pipe 5 enters the column still, we find that the percentage of the desired acid contained in the mixture upon each plate will decrease until on the top plate substantially no acid exists in the mixture. Also, as we proceed upwardly in the upper plates of the column we will find that the percentage of water in the ethylene chloride mixture increases.

The converse of this is, of course, that as we proceed downwardly from the uppermost plate of the column, the ratio of water to ethylene chloride very markedly decreases until at the lower plates of the column, nothing but ethylene chloride and concentrated acid exists upon these plates. Also, as we proceed downwardly through the lower plates of the column, we will find that the ratio of ethylene chloride to acid decreases until at the lower-most plate of the column it will be found that substantially pure concentrated acid exists. It will, therefore, be observed that this lower portion of the column 1 is made to perform the same function as the additional or supplemental column required in most processes of this general type. The substantially pure concentrated acid refluxes into the still pot 2 where the excess accumulating is drawn off through the pipe 4 and conducted to storage or such use as may be intended.

If, instead of introducing the aqueous acid in liquid form by means of the pipe 5, it be desired to employ the supplemental still pot 19, we may assume that the pipe line 5 is entirely shut off and the aqueous acid is conducted directly to the still pot 19. In the still pot 19 the aqueous acid is vaporized and the mixed vapors of water and acid are conducted by means of the pipe 18 into the column 1 at a point approximately one-third the way up the column. These acid and water vapors then travel up the column and meet the downwardly progressing stream or supply of ethylene chloride. The water combining with the ethylene chloride forms a constant boiling mixture which distills off and passes in a vaporous state into the next higher plate and so on up the column; the acid not vaporizing passes down the column so that the cycle occurring when the supplemental still pot 19 is utilized is the same in principle as when the aqueous acid is introduced into the column by the pipe 5 in liquid form, the difference being merely in the detail that the composition of the mixture upon each plate will vary slightly due to the fact that the water in liquid or vapor form, respectively, is introduced at a different position in the column. The pipe 18 may, of course, be provided with a suitable check valve in the event it may be desired to change from one mode of operation to the other at different times. As will be understood by those skilled in the art, the exact point in the column at which the liquid or vaporous aqueous acid is introduced is best determined by practice. It is sufficient to state that the attempt should be made to introduce the material to be dehydrated at a point where the composition of the mixture in the column has substantially the same water content as that being introduced.

It is also possible simultaneously to introduce the aqueous acid in vapor form through the line 18 and in liquid form through the line 5 and operate the process in that manner. In any event, in operating this process by any of the methods indicated it is necessary merely that the operator control the input of the various materials into the column in such a way that substantially concentrated acid issues from the bottom of the column and that a constant boiling mixture of ethylene chloride and water exists upon the top plate of the column.

From the foregoing it will be apparent that my invention may be carried out in many forms of apparatus, of which Fig. 1 is merely illustrative. In fact, the invention may be carried out with an ordinary balloon distillation flask and a condenser as a batch operation, although that would not be very economical on a commercial scale and does not result in the most efficient dehydration of the propionic acid. Although there is shown in Fig. 1 a single distillation column, it is to be understood that in the interest of economy of space or for other consideration it may be desirable to construct the column in two or more sections placed one above or alongside of the other or in staggered relation. Other forms of apparatus and methods of carrying out the invention may be employed without departing from the spirit and scope thereof.

It will be also understood that in all forms of apparatus the customary precautions for preventing heat losses by suitable insulation are observed, and the parts which contact with the acid are made of acid-resistant materials customarily employed for that purpose. Furthermore, the process is preferably operated under atmospheric pressure conditions, although it may be conducted with the system at superatmospheric pressure or subatmospheric. When I refer herein to the boiling points of the ingredients and mixture such, for instance, as the boiling point of water, I refer to the boiling points under the particular pressure conditions that are employed, normally atmospheric.

Figures 2 and 3 show graphically the marked improvement obtained by the use of my process in the dehydration of propionic acid, for example.

Figure 2 shows the results obtained by simple distillation of aqueous propionic acid without the use of a water entraining liquid, the curve being obtained by plotting the percentage of water in the distillate against the percentage of water in the still pot. It will be apparent that since the curve lies only very slightly above the 45° straight line representing the same percentages of water in the distillate and liquid undergoing distillation, respectively, no matter what the strength of the aqueous acid is, the percentage of water in the distillate obtained will be only slightly greater and it is, therefore, not very economical to concentrate the aqueous acid by plain distillation.

Figure 3, on the other hand, shows the curve plotted under corresponding conditions when using ethylene chloride as the water entraining liquid, i. e., the abscissa represents the percentage of water in the aqueous propionic acid undergoing distillation in the presence of an amount of ethylene chloride equal in weight to that of the aqueous propionic acid. It will be noted in this case that the curve lies very considerably more above the 45° line than in the case of Figure 2 which clearly proves the marked advantages to be obtained in the dehydration of the higher acids by my process. Further evidence of the marked improvement obtained will be shown by comparison with Figure 7 of U. S. Patent No. 1,804,745, which depicts a curve plotted from data obtained in the concentration of aqueous acetic acid under the same conditions. Comparison of these two curves shows at once that the curve for the dehydration of propionic acid is much farther above the 45° line than in the case of acetic, indicating an unexpected and highly valuable result when using ethylene chloride for dehydrating aqueous propionic acid.

What I claim as new and desire to secure by Letters Patent is:

1. The process of dehydrating aqueous propionic acid which comprises mixing ethylene dichloride therewith and distilling water and ethylene dischloride from the mixture.

2. The process of dehydrating aqueous propionic acid which comprises mixing ethlene dichloride therewith and distilling therefrom a constant boiling mixture of ethylene dichloride and water, at a temperature below the boiling point of water.

3. The process of dehydrating aqueous propionic acid which comprises mixing ethylene dichloride therewith, distilling a constant boiling mixture of ethylene dichloride and water from the aqueous mixture, condensing the distillate, allowing it to settle into two layers, and returning the lower ethylene dichloride layer to the mixture undergoing distillation.

4. The process of dehydrating aqueous propionic acid which comprises mixing therewith approximately twelve times as much ethylene dichloride by weight as there is water present in the aqueous acid, distilling therefrom a constant boiling mixture of ethylene dichloride and water, condensing the distillate, allowing it to settle into two layers, and returning the lower ethylene dichloride layer to the mixture undergoing distillation.

5. The process of dehydrating aqueous propionic acid which comprises mixing therewith approximately 12 times as much ethylene dichloride by weight as there is water present in the aqueous acid, distilling therefrom a constant boiling mixture of ethylene chloride and water, condensing the distillate, allowing it to settle into two layers, returning the lower ethylene dichloride layer to the mixture undergoing distillation and removing the dehydrated acid from the latter mixture.

6. The process of dehydrating aqueous propionic acid which comprises mixing therewith slightly more than twelve times as much ethylene dichloride by weight as there is water present in the aqueous acid, distilling the mixture and removing therefrom in vapor form and at a temperature below the boiling point of water a constant boiling mixture of ethylene dichloride and water, condensing the distillate and allowing it to settle into two layers, returning the lower layer to the distillation mixture and continuously removing dehydrated propionic acid from said distillation mixture.

7. The process of dehydrating an aqueous mixture of acetic containing propionic and other higher aliphatic acids containing up to 5 carbon atoms which comprises mixing ethylene dichloride therewith and distilling therefrom a constant boiling mixture of ethylene dichloride and water.

8. The process of claim 7 which includes the additional steps of condensing the distillate, separating it into two layers and returning the lower ethylene dichloride layer to the mixture undergoing distillation.

9. The process of dehydrating an aqueous mixture of acetic and propionic acids which comprises mixing ethylene dichloride therewith and distilling therefrom a constant boiling mixture of ethylene dichloride and water.

10. The process of dehydrating an aqueous monobasic aliphatic acid solution containing an acid of 3-5 carbon atoms which comprises mixing ethylene dichloride therewith and distilling therefrom a constant boiling mixture of ethylene dichloride and water.

11. The process of dehydrating an aqueous mixture of monobasic aliphatic acids of 3-5 carbon atoms which comprises mixing ethylene dichloride therewith and distilling therefrom a constant boiling mixture of ethylene dichloride and water.

12. The process of dehydrating aqueous butyric acid which comprises mixing ethylene dichloride therewith and distilling therefrom a constant boiling mixture of ethylene dichloride and water.

13. The process of dehydrating aqueous valeric acid which comprises mixing ethylene dichloride therewith and distilling therefrom a constant boiling mixture of ethylene dichloride and water.

HERBERT G. STONE.